(12) United States Patent
Bey

(10) Patent No.: US 9,933,089 B2
(45) Date of Patent: Apr. 3, 2018

(54) DECOMPRESSION INSERT FOR ROTARY VALVE AND ROTARY VALVE PROVIDED WITH SUCH AN INSERT

(71) Applicant: Roger Bey, Illzach (FR)

(72) Inventor: Roger Bey, Illzach (FR)

(*) Notice: Subject to any disclaimer, the term of this patent is extended or adjusted under 35 U.S.C. 154(b) by 22 days.

(21) Appl. No.: 15/308,629

(22) PCT Filed: Apr. 30, 2015

(86) PCT No.: PCT/FR2015/051168
§ 371 (c)(1),
(2) Date: Nov. 3, 2016

(87) PCT Pub. No.: WO2015/170042
PCT Pub. Date: Nov. 12, 2015

(65) Prior Publication Data
US 2017/0184218 A1    Jun. 29, 2017

(30) Foreign Application Priority Data

May 7, 2014  (FR) ...................................... 14 54108

(51) Int. Cl.
*F16K 47/04*    (2006.01)
*F16K 47/08*    (2006.01)
(Continued)

(52) U.S. Cl.
CPC ................ *F16K 47/08* (2013.01); *F16K 5/12* (2013.01); *F16K 5/20* (2013.01); *F16K 47/045* (2013.01); *F16K 47/16* (2013.01)

(58) Field of Classification Search
CPC .......... F16K 47/08; F16K 47/14; F16K 47/16; F16K 47/04; F16K 47/045; F16K 5/12; F16K 5/20; F16K 1/52
(Continued)

(56) References Cited

U.S. PATENT DOCUMENTS

| 4,276,906 A | 7/1981 | Eguchi |
| 5,480,123 A | 1/1996 | Bey |

(Continued)

FOREIGN PATENT DOCUMENTS

| FR | 2 697 888 A1 | 5/1994 |
| WO | 2009/076228 A2 | 6/2009 |

OTHER PUBLICATIONS

International Search Report Corresponding to PCT/FR2015/051168 dated Aug. 6, 2015.
(Continued)

*Primary Examiner* — Ian Paquette
(74) *Attorney, Agent, or Firm* — Davis & Bujold PLLC; Michael J. Bujold

(57) ABSTRACT

A rotary valve for fluid flowing in a pipe. The valve has a body provided with upstream and downstream segments located on either side of a central recess constituting a seat into which a rotary sealing element, including a through-channel, is inserted. A decompression insert is arranged in the upstream segment and provided with a first cylindrical section having an outer cross-section equal to the cross-section of the upstream segment, a second cylindrical section having a cross-section that is narrower than the first cylindrical section, and a third section, referred to as frusta-conical connection section, for connecting the first and second sections. The decompression insert has a plurality of radial openings provided in at least one of the walls of the second and/or the third sections in order to diffuse the fluid toward the through-channel of the sealing element during a partial opening phase of the rotary valve.

18 Claims, 4 Drawing Sheets

(51) Int. Cl.
  *F16K 5/12* (2006.01)
  *F16K 5/20* (2006.01)
  *F16K 47/16* (2006.01)

(58) Field of Classification Search
  USPC ................ 251/315.01, 315.1, 118, 125, 127; 137/625.28, 625.3
  See application file for complete search history.

(56) References Cited

U.S. PATENT DOCUMENTS

| | | | | |
|---|---|---|---|---|
| 5,588,635 | A | * 12/1996 | Hartman | ................... F15D 1/04 138/44 |
| 5,799,695 | A | 9/1998 | Bey | |
| 5,890,505 | A | * 4/1999 | Boger | ....................... F16K 5/06 137/1 |
| 5,937,901 | A | * 8/1999 | Bey | ....................... F16K 47/045 137/625.32 |
| 5,988,586 | A | * 11/1999 | Boger | .................... F16K 47/08 138/42 |
| 7,178,782 | B1 | * 2/2007 | York | ......................... F16K 5/12 137/625.3 |

OTHER PUBLICATIONS

Written Opinion Corresponding to PCT/FR2015/051168 dated Aug. 6, 2015.

* cited by examiner

DECOMPRESSION INSERT FOR ROTARY VALVE AND ROTARY VALVE PROVIDED WITH SUCH AN INSERT

TECHNICAL SCOPE

This invention relates to a decompression insert for a rotary valve, this decompression insert being arranged to diffuse a part of a fluid flowing in a pipe, during a partial opening phase of said rotary valve, said rotary valve comprising a body provided with an upstream segment with a supply opening connected to a fluid supply section in said pipe and with a downstream segment provided with an evacuation opening connected to a fluid exit section in the pipe, the body of said rotary valve comprising a central recess forming a seat in which a rotary sealing element is inserted, said rotary sealing element comprising a through channel to allow the passage of the fluid through said rotary valve when it is at least partly open.

This invention also relates to a rotary valve for a fluid flowing in a pipe, comprising a body provided with an upstream segment with a supply opening connected to a fluid supply section in said pipe and with a downstream segment provided with an evacuation opening connected to a fluid exit section in the pipe, said body comprising a central recess forming a seat in which a rotary sealing element is inserted, said rotary sealing element comprising a through channel to allow the passage of the fluid through said rotary valve when it is at least partly open.

PRIOR ART

A rotary valve of this type is for example illustrated by publication FR 2 697 888 A1, which describes a ball valve comprising channels arranged in the ball in order to minimize the turbulences when a fluid flows through the rotary valve. These turbulences are more specifically due to the pressures that are exerted by the fluid passing through the valve at the moment of its opening, and in particular during the initial phase of its opening.

This valve type, which is currently well known and widely used, actually allows reducing the pressure upstream of the seat of the valve in order to allow a conversion of the energy due to the pressure constraints during the opening phase until the valve reaches a certain opening angle. The problem of the wear of the valves because of these constraints is particularly crucial for the valves mounted on pipes transporting liquids strongly loaded, in particular with mineral loads such as very erosive sand grains or similar. In fact, during this opening, the potential energy suddenly transforms into kinetic energy, releasing a fluid that moves at high speed, which is the source of erosion and turbulences. This phenomenon also generates vibrations in the valve and moreover increases the sound level and the mechanical fatigue of this valve.

Publication U.S. Pat. No. 4,276,906 A describes a regulation ball valve provided with a substantially cylindrical sealing element housed in an outlet pipe, axially movable between a closed position and an opened position with respect to a seat housed in an inlet pipe and separated from the outlet pipe by a wall. The sealing element comprises fluid passage openings towards the outlet pipe, which are located in the peripheral wall of the chamber that is to say in the wall of the cylindrical section with the largest diameter. On the one hand, the shape of this sealing element creates a zone where impurities accumulate in the upper section of the chamber without allowing their evacuation when the valve is totally opened, as the flow does not wash this upper section. On the other hand, this sealing element does not form a decompression insert for the purpose of the invention and does not allow solving the problems mentioned above linked with the turbulences during the valve opening phase.

Publication WO 2009/076228 A2 describes a rotary ball valve provided, downstream of the sealing element, in its outlet pipe, with a decompression insert that can be mounted in the seat of the valve. This insert is provided with several fluid passages and is made of a plurality of superimposed perforated plates oriented perpendicularly to the flow. So, this decompression insert interferes with the flow even when the sealing element is totally opened.

Finally, publication U.S. Pat. No. 5,480,123 A belonging to the applicant describes a rotary butterfly valve provided with two decompression inserts provided respectively upstream and downstream of the sealing element. The illustrated inserts are partial, interfere with the flow even when the sealing element is fully opened and are not suitable for a ball valve.

DESCRIPTION OF THE INVENTION

The present invention aims to overcome the disadvantages of the known ball or ball segment valves by offering a rotary valve in which one manages to reduce in an effective, simple and cost-effective way the generation of detrimental turbulences during the opening phase and to reduce accordingly both the wear, in particular when the valve is mounted on a pipe transporting loaded fluids, and the noise, without affecting the operation of the valve nor interfering with its flow at full opening. Moreover, the improvement made on this valve type can be transposed to almost all valves of this type in the form of a complementary additive element that can be adapted on the existing valves.

This goal is achieved by a decompression insert as described in the preamble, characterized in that said decompression insert comprises at least a first cylindrical section, at least a second cylindrical section whose cross-section is narrower than that of said first cylindrical section, and at least a third section referred to as frusto-conical connection section for connecting said first section and said second section, and in that said decompression insert comprises means for diffusing said fluid as from the beginning of the opening phase of the rotary valve, said means for diffusing said fluid comprising a plurality of radial openings provided in at least a part of the walls of the second section and/or of the third section, this decompression insert being intended to be placed at least in the upstream section of the body of said rotary valve.

Said third section with a frusto-conical shape has advantageously a base whose cross-section is substantially equal to the cross-section of said first cylindrical section and a top whose cross-section is substantially equal to that of said second cylindrical section.

According to a first embodiment, said plurality of radial openings is provided in at least a part of said second cylindrical section.

According to another embodiment, said plurality of radial openings is provided in at least a part of said third section referred to as connection section.

According to yet another embodiment, said plurality of radial openings is provided both in at least a part of said second cylindrical section and in at least a part of said connection section.

Said decompression insert is advantageously made in the form of a removable element arranged to be put in place and held in position when it is placed in the body of said rotary valve.

Said decompression insert is advantageously provided with fastening means arranged to hold it in position when it is placed in the body of said rotary valve.

This goal is also achieved by a rotary valve as defined in the preamble characterized in that it comprises at least one decompression insert as defined above, placed in at least said upstream segment of the body of said rotary valve.

It advantageously comprises two decompression inserts placed respectively in the upstream segment and in the downstream segment of the body of said rotary valve.

In the preferred embodiment, said decompression insert comprises a first cylindrical section whose outer cross-section is equal to the cross section of said upstream segment of said rotary valve body, a second cylindrical section whose cross-section is narrower than that of said first cylindrical section, and a third section referred to as frusto-conical connection section for connecting said first and second sections, and in that said decompression insert comprises means for diffusing said fluid as from the beginning of the opening phase of the rotary valve, said means for diffusing said fluid comprising a plurality of radial openings provided in at least a part of the second section and/or of the third section.

BRIEF DESCRIPTION OF THE DRAWINGS

The present invention and its advantages will be better revealed in the following description of several embodiments given as non-limiting examples, in reference to the drawings in appendix, in which.

VARIOUS WAYS OF REALIZING THE INVENTION

Figure 1:
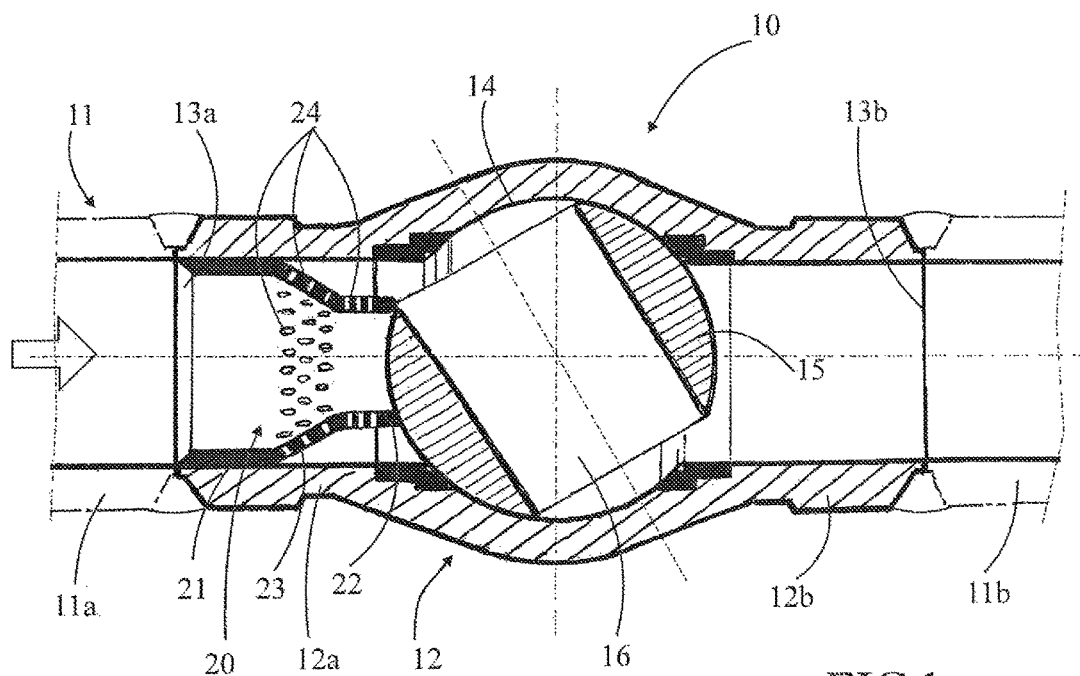
FIG. 1 is a longitudinal cross-sectional view of a first embodiment of a rotary valve of the "ball valve" type, according to the invention, in partially opened position.

FIG. 1 represents a valve referred to as rotary valve 10 made of a ball valve or of a ball segment valve, this rotary valve being mounted on a pipe 11 of a fluid flowing in said pipe 11 and comprising a body 12 provided with an upstream segment 12a with a supply opening 13a for the fluid transported in pipe 11 and a downstream segment 12b with an evacuation opening 13b for this fluid. Upstream segment 12a is connected to a fluid supply section 11a and downstream segment 12b is connected to a fluid evacuation section 11b. Body 12 of rotary valve 10 comprises a spherical central recess 14 forming a seat in which a sealing ball 15 rotating about an axis perpendicular to the axis of body 12 of rotary valve 10 is inserted. Sealing ball 15 comprises a through channel 16 whose cross-section is substantially equal to the cross-section of upstream segment 12a and of downstream segment 12b of body 12 of rotary valve 10, so that, in fully open position, the fluid transported by pipe 11 can pass freely through valve 10 without being slowed down or perturbed by obstacles liable to generate turbulences.

It has been noted that this type of valves, in particular when they are placed on pipes 11 transporting loaded fluids, deteriorates rapidly because of the erosion suffered due to the turbulences induced by the fluid passing through rotary valve 10. It is essential to reduce these turbulences, in particular by lowering the pressure when passing through the valve. This invention provides a simple and efficient solution that allows reducing these pressures and consequently the erosion suffered by the internal walls of the valve body and the sealing ball.

To that purpose, valve 10 is equipped with at least one decompression insert 20 arranged to diffuse a part of the fluid flowing in a pipe 11, during an initial opening phase of rotary valve 10, this initial phase corresponding to the partial opening illustrated in FIG. 1. In fact, during this initial opening phase, the pressure in upstream segment 12a is highest and the turbulences are strong, in particular because of the depression generated by downstream section of pipe 11. Of course, these same phenomena occur when rotary valve 10 is in its final closing phase. To allow diffusing a part of the fluid, said decompression insert 20 comprises a first cylindrical section 21, whose outer cross-section is equal to the inner cross-section of said upstream segment 12a of body 12 of rotary valve 10, at least one second cylindrical section 22 whose cross-section is reduced with respect to that of first cylindrical section 21, and a connection segment 23 with a frusto-conical shape, arranged to connect said first cylindrical section 21 and said second cylindrical section 22 to each other. At least the wall of said connection section 23 and possibly that of said second cylindrical section 22 comprise radial through openings or perforations 24 forming a network of peripheral diffusion openings. The wall of first cylindrical section 21 comprises no radial openings 24 as it is arranged to fit at least the wall of upstream segment 12a of body 12, in which said insert 20 is inserted. This insert 20 is an independent part intended for being mounted in any type of valves 12 and for being held in position by any known fastening means. This insert 20 can be mounted detachably inside of valve body 12 by press-fit assembly, locked by a set screw or not, by screwed assembly locked by a lock nut or not, or similar. It can also be mounted definitively inside of valve body 12 by welding or similar. Insert 20 can also comprise a collar making up a fastening flange arranged between valve body 12 and pipe 11. These examples are of course not limiting.

FIG. 1 represents rotary valve 10 during its opening or closing phase. Sealing ball 15 is turned so that it seals decompression insert 20, while putting into communication through channel 16 and the space located between the inside of upstream segment 12a of body 12 of rotary valve 10 and sections 22 and 23 of decompression insert 20. This communication takes place through radial openings 24 with the purpose of reducing the pressure in upstream section 12a of rotary valve 10 during this preliminary opening or closing phase of through channel 16.

Figure 2:
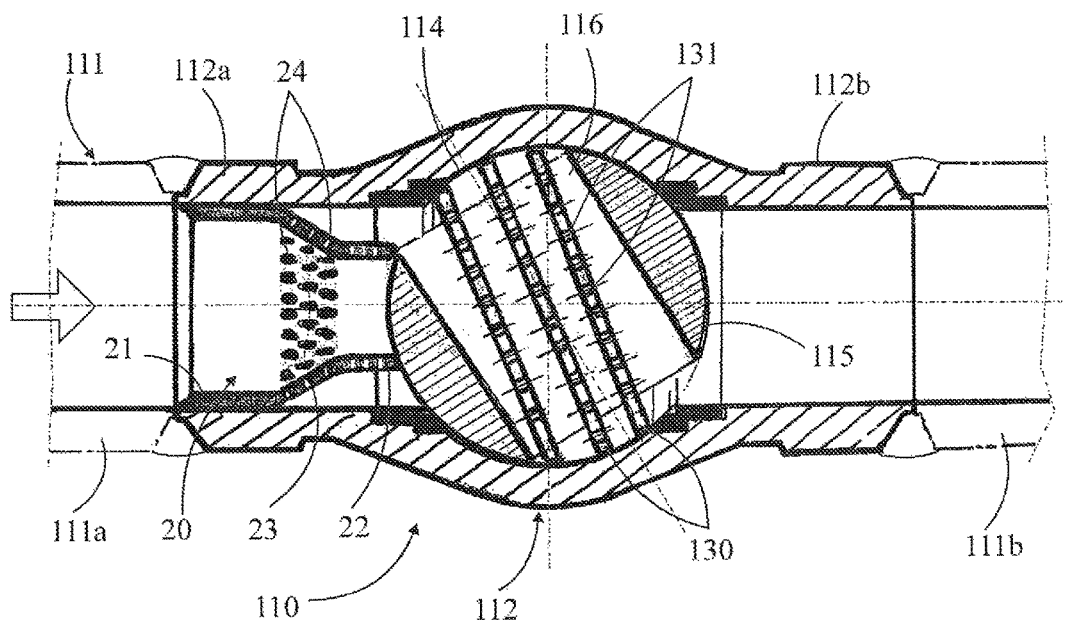
FIG. 2 is a longitudinal cross-sectional view of a second embodiment of a rotary valve similar to a ball valve, according to the invention, in partially opened position.

FIG. 2 represents a view similar to that of FIG. 1, showing a rotary ball valve 110 of which nearly all components are identical to those of rotary valve 10 of FIG. 1, notably body 112, with the exception of sealing ball 115, which is housed in a spherical recess 114 and is of the type with perforated internal partitions 130 provided inside of through channel 116. In this system known per se, ball valve 110 is called silent, this feature being due to the fact that passages 131 or perforations in partitions 130 allow the fluid to flow with a reduction of the turbulences and consequently of the noise and wear. It moreover comprises a decompression insert 20 identical to that of the embodiment represented in FIG. 1 and placed in upstream segment 112a of body 112 of rotary valve 110.

Figure 3:
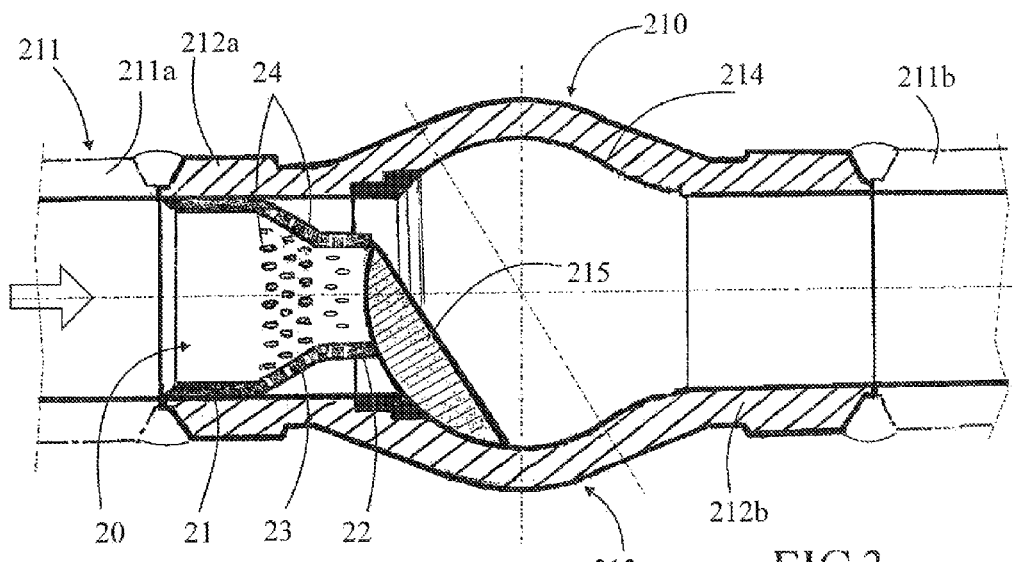
FIG. 3 is a longitudinal cross-sectional view of a third embodiment of a rotary valve similar to a ball valve, according to the invention, in partially opened position.

FIG. 3 is a view similar to that of FIG. 1 and shows a rotary valve 210 of which nearly all components are identical to those of rotary valve 10 of FIG. 1, with the exception of sealing ball 15, which is replaced with a rotary ball segment 215 that can turn between two end positions, one corresponding to the full valve opening and the other to the total valve closure. Ball segment 215 is housed in a central spherical recess 214 of body 212 of rotary valve 210. The partial opening or closing phase represented by FIG. 3 allows releasing a part of the pressure upstream of the valve, through radial openings or perforations 24 provided in the wall of decompression insert 20, which is similar to decompression inserts 20 described previously.

Figure 4:
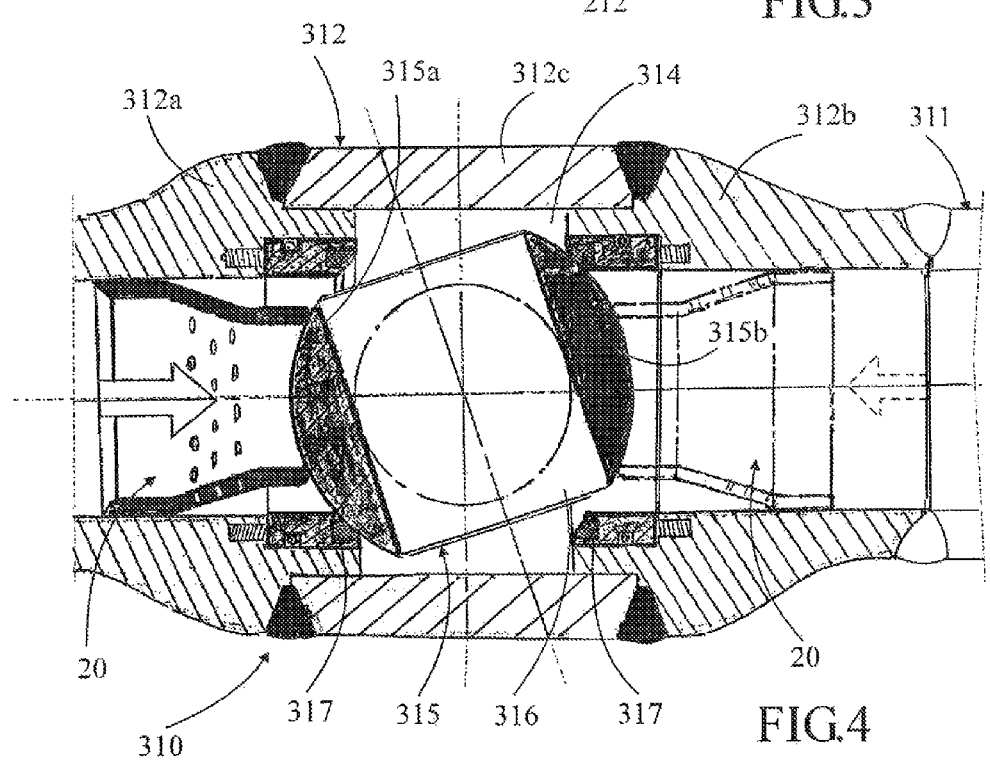
FIG. 4 is a longitudinal cross-sectional view of a fourth embodiment of a rotary valve similar to a ball valve, according to the invention, in partially opened position.

FIG. 4 represents another embodiment of a rotary valve 310 whose body 312 is made of a central element 312c with a cylindrical external shape, of an upstream element 312a and of a downstream element 312b mounted on either side of central element 312c, which are mechanically assembled together. Such body 312 of rotary valve 310 is easier to manufacture than valve bodies 12, 112, 212 represented in FIGS. 1 to 3 described above. Sealing element 315 is made of two spherical caps 315a and 315b, which delimit between them a through channel 316 and which are arranged inside of a central recess 314 of body 312. Central recess 314 provided inside of central element 312c is cylindrical and provided with seats 317 with a spherical bearing, which are mounted in upstream 312a and downstream 312b elements of body 312. The operating mode of rotary valve 310 is identical to that of the previous rotary valves 10, 110, 210 and its purpose is also to reduce the upstream pressure. It must be noted that a decompression insert 20 is placed on either side of rotary valve 310. Rotary valve 310 can operate in both directions, that is to say that the upstream inlet can become the downstream outlet and vice-versa, according to the flow direction of the fluid in pipe 311. Both decompression inserts 20 are intended to carry out alternately the same functions of reducing the pressure and decreasing the erosion due to the turbulences of the loaded water.

Figure 5:
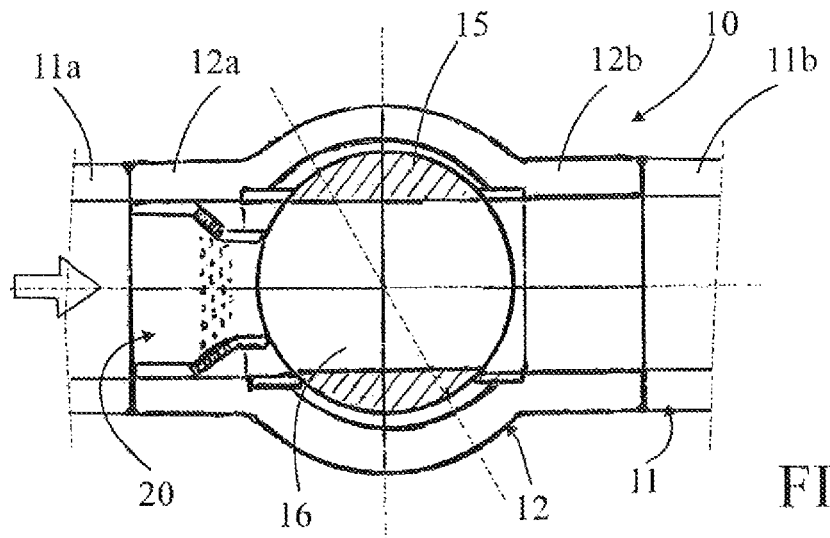
FIG. 5 is a longitudinal cross-sectional view of an embodiment of a rotary valve identical to that of FIG. 1, in fully opened position.

FIG. 5 represents rotary valve 10 of FIG. 1 in fully open position. It must be noted that through channel 16 of sealing ball 15, which has a cylindrical shape, has exactly the same cross-section as upstream segment 12a and downstream segment 12b of the valve, which are respectively connected to supply section 11a and to evacuation section 11b for the fluid transported in pipe 11. This configuration makes rotary valve 10 self-cleaning when fully opened, as there is no accumulation zone inside of valve 10. Only one decompression insert 20 is provided on the upstream side of rotary valve 10, as this valve is intended for unidirectional use from the left to the right in FIG. 5. At full opening, passing a scraper device is possible, even if the cross-section of a part of decompression insert 20 is smaller than the cross-section of pipe 11 and, than that of upstream 12a and downstream 12b segments of body 12 of said rotary valve 10.

Figure 6:
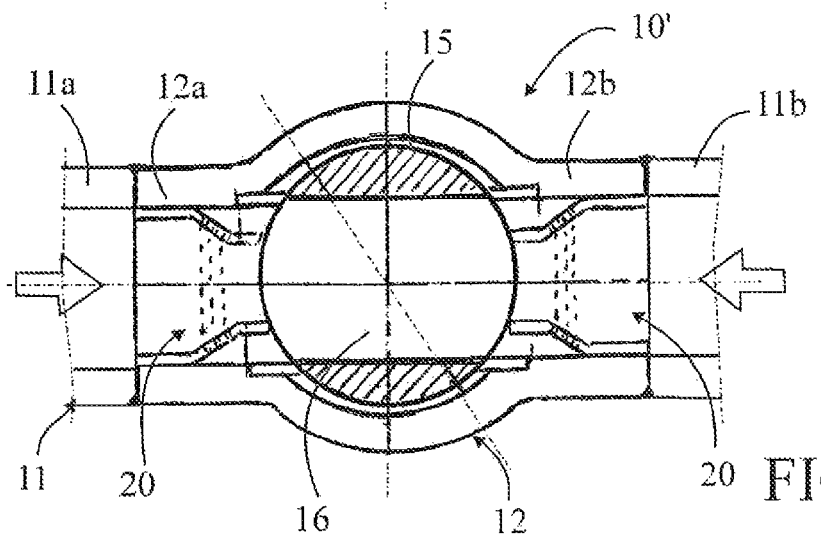
FIG. 6 is a longitudinal cross-sectional view of an embodiment of a rotary valve in fully opened position, comprising two identical decompression inserts located on either side of the sealing ball.

FIG. 6 represents a rotary valve 10' substantially identical to rotary valve 10 of FIG. 1, fully opened, but with the characteristic of being bidirectional. To that purpose, rotary valve 10' comprises two identical decompression inserts 20 located respectively on either side of through channel 16, which has a cylindrical shape, and having strictly the same functions according to the flow direction of the fluid in pipe 11. When rotary valve 10' is fully opened, the upstream side will be washed by the entering flow and the automatic cleaning function will take place on the inlet side of the rotary valve. This side changes according to the flow direction of the fluid in pipe 11.

Figure 7:
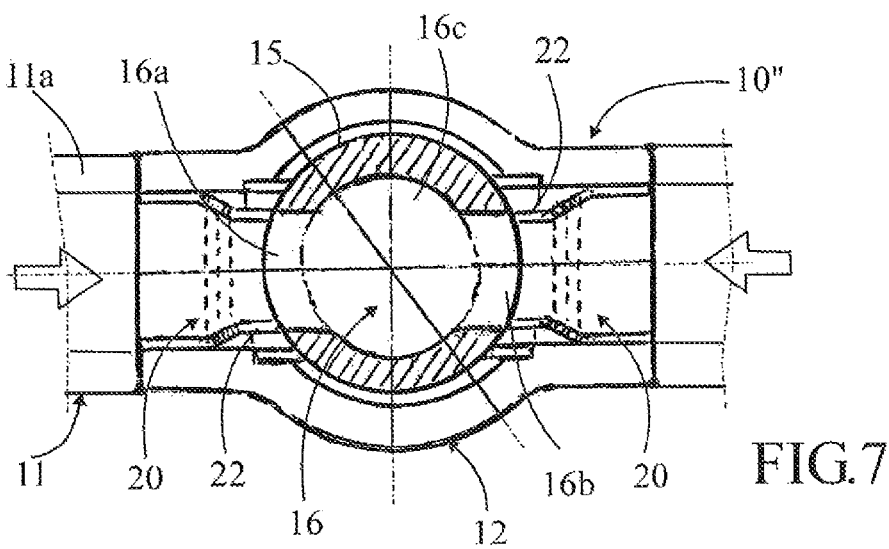
FIG. 7 is a longitudinal cross-sectional view of another embodiment of a rotary valve according to the invention, in fully opened position.

FIG. 7 represents a rotary valve 10" that is derived from rotary valve 10' of FIG. 6 in that it is bidirectional and comprises two identical decompression inserts 20 located respectively on either side of through channel 16, which has a complex shape. This through channel 16 is in fact spherical in its central section 16c and cylindrical in its end sections 16a and 16b. At full opening, the passage of the fluid in body 12 of rotary valve 10" is limited to the cross-section of the narrow section of decompression inserts 20 at the level of second cylindrical sections 22.

Figure 9:
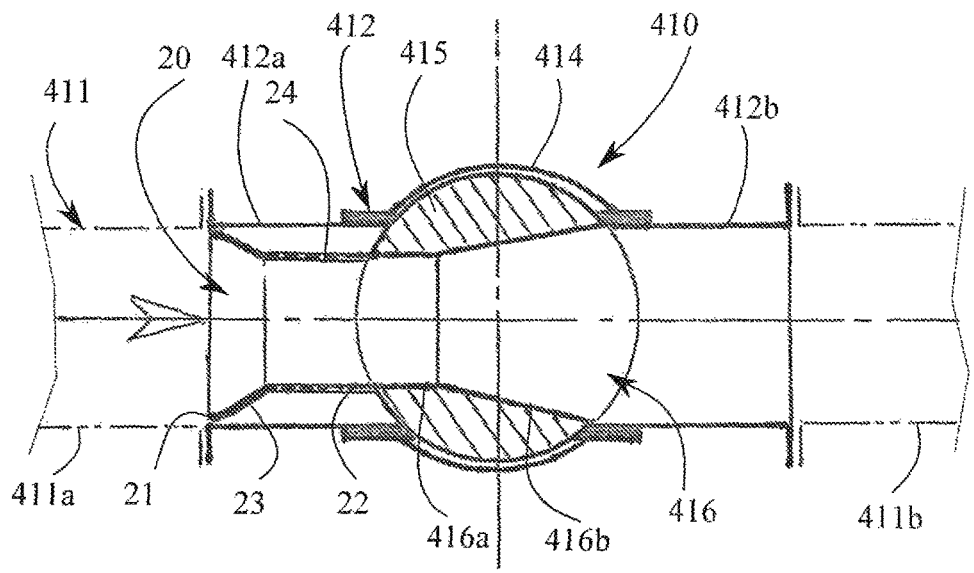
FIG. 9 is a view similar to that of FIG. 8, showing the valve in fully opened position.
Figure 8:
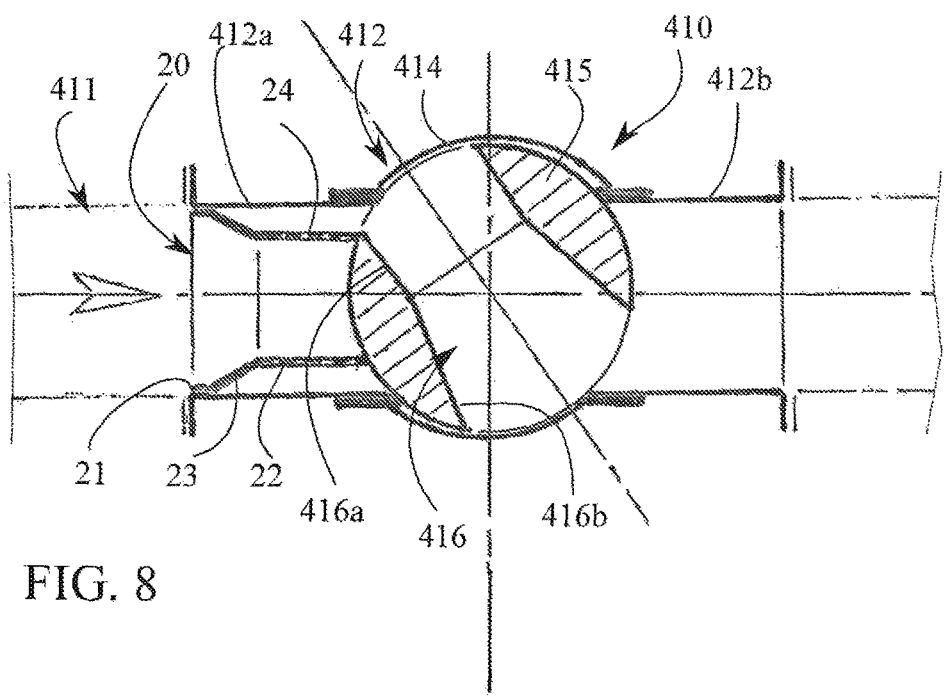
FIG. 8 is a longitudinal cross-sectional view of a fifth embodiment of a rotary valve similar to a ball valve, according to the invention, in partially opened position.

FIGS. 8 and 9 represent a view similar to that of FIG. 1, showing a rotary ball valve 410 of which nearly all components are identical to those of rotary valve 10 of FIG. 1, notably body 412, which is represented schematically, and sealing ball 415, which is housed in a spherical recess 414 of body 412. It also comprises a decompression insert 20 substantially identical to that of the embodiment represented in FIG. 1 and placed in upstream segment 412a of body 412 of rotary valve 410. The differences lie in through channel 416 of sealing ball 415, which has a complex "Venturi"-type shape, and in insert 20 whose radial openings 24 are provided only in second cylindrical section 22. Through channel 416 comprises a cylindrical upstream section 416a with a cross-section identical to that of second cylindrical section 22 of insert 20, followed by a frusto-conical downstream section 416b that widens from cylindrical upstream section 416a towards downstream segment 412b of body 412 and ends with a cross-section identical to that of said downstream segment 412b of valve 410. Fully opened, as represented in FIG. 9, the widening shape of through channel 416 allows achieving a minimum head loss in the transported fluid. Also, in this embodiment, rotary valve 410 equipped with its insert 20 allows, during the opening phase as represented in FIG. 8, a fluid flow with a reduction of the turbulences and consequently of the noise and wear.

POSSIBILITIES FOR INDUSTRIAL APPLICATION

These various embodiments are operating in similar ways, and all of them allow reaching the goals defined by the invention, that is to say reduce the pressure on the upstream side, decrease the noise, the turbulences and the erosion of the valve body and of the sealing element, as well as allow valve self-cleaning thanks to the presence, on the upstream side, in the flow direction of the fluid, of a decompression insert that begins to let the fluid pass when the valve starts to open, allows maximum flow when the valve is fully opened and reduces again this flow when the valve finishes to close, without generating an accumulation zone.

The present invention is not restricted to the examples described above, but extends to any modification and variant which is obvious to a person skilled in the art. The various through channels can be adapted in any type of sealing element, such as balls or similar, according to the goals to reach and according to the parameters of the fluids to be regulated.

The invention claimed is:

1. A decompression insert (20) for a rotary valve (10, 10', 10" 110, 210, 310, 410), the decompression insert being arranged to diffuse a part of a fluid flowing in a pipe (11, 111, 211, 311, 411), during a partial opening phase of the rotary valve, the rotary valve comprising a body (12, 112, 212, 312, 412) provided with an upstream segment (12a, 112a, 212a, 312a, 412a) with a supply opening (13a) connected to a fluid supply section (11a, 111a, 211a, 311a, 411a) in the pipe and with a downstream segment (12b, 112b, 212b, 312b, 412b) provided with an evacuation opening (13b) connected to a fluid exit section (11b, 111b, 211b, 311b, 411b) in the pipe, the body (12, 112, 212, 312, 412) comprising a central recess (14, 114, 214, 314, 414) forming a seat in which a rotary sealing element (15, 115, 215, 315, 415) is inserted, the sealing element (15, 115, 215, 315, 415) comprising a through channel (16, 116, 216, 316, 416) to allow passage of the fluid through the rotary valve (10, 10', 10", 110, 210, 310, 410) when the rotary valve is at least partly open, the decompression insert (20) comprises at least a first cylindrical section (21), at least a second cylindrical section (22) having a cross-section that is narrower than a cross-section of the first cylindrical section (21), and at least a third section (23) which is a frusto-conical connection section for connecting the first section to the second section, and the decompression insert (20) comprises means for diffusing the fluid from a beginning of the opening phase of the rotary valve, the means for diffusing the fluid comprising a plurality of radial openings (24) provided only in at least a portion of a wall of at least one of the second section (22) and the third section (23), and the decompression insert being placed at least in the upstream segment (12a, 112a, 212a, 312a, 412a) of the body (12, 112, 212, 312) of the rotary valve (10, 110, 210, 310).

2. The decompression insert according to claim 1, wherein the third section (23), with the frusto-conical connection section, has a base with a cross-section that is substantially equal to the cross-section of the first cylindrical section (21) and a top with a cross-section that is substantially equal to the cross-section of the second cylindrical section (22).

3. The decompression insert according to claim 1, wherein the plurality of radial openings (24) are provided in at least a portion of the second cylindrical section (22).

4. The decompression insert according to claim 1, wherein the plurality of radial openings (24) are provided in at least a portion of the third section (23).

5. The decompression insert according to claim 1, wherein the plurality of radial openings (24) are provided in at least a portion of both the second cylindrical section (22) and the third section (23).

6. The decompression insert according to claim 1, wherein the decompression insert is an independent and removable element and is provided with fastening means which is arranged for securing the decompression insert in position when the decompression insert is placed in the body of the rotary valve.

7. A rotary valve (10, 10', 10", 110, 210, 310, 410) for a fluid flowing in a pipe (11, 111, 211, 311, 411), comprising a body (12, 112, 212, 312, 412) provided with an upstream segment (12a, 112a, 212a, 312a, 412a) with a supply opening (13a) connected to a fluid supply section (11a, 111a, 211a, 311a, 411a) in the pipe (11, 111, 211, 311, 411) and with a downstream segment (12b, 112b, 212b, 312b, 412b) provided with an evacuation opening (13b) connected to a fluid exit section (11b, 111b, 211b, 311b, 411b) in the pipe (11, 111, 211, 311, 411), the body comprising a central recess (14, 114, 214, 314, 414) forming a seat in which a rotary sealing element (15, 115, 215, 315, 415) is inserted, the sealing element comprising a through channel (16, 116, 216, 316, 416) to allow passage of the fluid through the rotary valve when the rotary valve is at least partly open, the rotary valve comprises at least one decompression insert (20), according to claim 1, placed at least in the upstream segment (12a, 112a, 212a, 312a, 412a) of the body (12, 112, 212, 312, 412) of the rotary valve (10, 10', 10", 110, 210, 310, 410).

8. The rotary valve according to claim 7, wherein the rotary valve comprises two decompression inserts (20) respectively placed in the upstream segment (12a, 112a, 212a, 312a, 412a) and in the downstream segment (12b, 112b, 212b, 312b, 412b) of body (12, 112, 212, 312, 412) of the rotary valve (10, 10', 10", 110, 210, 310, 410).

9. The rotary valve according to claim 7, wherein the decompression insert forms of an independent and removable element and is provided with fastening arrangement which is arranged to secure the decompression insert in position in the body of the rotary valve.

10. The rotary valve according to claim 7, wherein the decompression insert (20) comprises a first cylindrical section (21) whose outer cross-section is equal to a cross section of the upstream segment (12a), a second cylindrical section (22) whose cross-section is narrower than that of the first cylindrical section (21), and a third section (23), which is a frusto-conical connection section, connecting the first and the second sections (21, 22) with one another, and the decompression insert (20) comprises means for diffusing the fluid from a beginning of an opening phase of the rotary valve, the means for diffusing the fluid comprising a plurality of radial openings (24) provided only in at least a portion of the walls of at least one of the second section (22) and the third section (23) of the decompression unit (20).

11. The rotary valve according to claim 10, wherein the third section (23), which is the frusto-conical connection section, has a base which has a cross-section that is substantially equal to the cross-section of the first cylindrical section (21) and a top whose cross-section is substantially equal to that of the second cylindrical section (22).

12. The rotary valve according to claim 10, wherein the plurality of radial openings (24) are provided in at least a portion of the second cylindrical section (22).

13. The rotary valve according to claim 10, wherein the plurality of radial openings (24) are provided in at least a portion of the third section (23).

14. The rotary valve according to claim 10, wherein the plurality of radial openings (24) are provided in at least a portion of the second cylindrical section (22) and in at least a portion of the third section (23).

15. A rotary valve for a fluid flowing in a pipe, the rotary valve comprises:
a body comprising an upstream segment having a supply opening that is connected to a fluid supply section in the pipe, and a downstream segment having an evacuation opening that is connected to a fluid exit section in the pipe, and the body comprising a central recess forming a seat;

a rotary sealing element being inserted into the seat of the body and comprising a through channel to allow the fluid flow through the rotary valve, when the rotary sealing element is at least partly open;

an upstream decompression insert that is arranged in the upstream segment of the body of the rotary valve, the upstream decompression insert comprising first and second cylindrical sections and a frusto-conical section interconnecting the first cylindrical section with the second cylindrical section, a plurality of radial openings being provided only in at least one of a wall of the frusto-conical section and a wall of the second cylindrical section of the upstream decompression insert.

16. The rotary valve according to claim 15, wherein the upstream decompression insert is arranged in the upstream segment of the body of the rotary valve such that the first cylindrical section is adjacent the fluid supply section in the pipe and the second cylindrical section is adjacent the seat of the body, an outer surface of the first cylindrical section abuts against an interior surface of the upstream segment of the body of the rotary valve, and a diameter of the second cylindrical section is smaller than a diameter of the first cylindrical section.

17. The rotary valve according to claim 15, wherein a downstream decompression insert is arranged in the downstream segment of the body of the rotary valve, the downstream decompression insert comprises first and second cylindrical sections and a frusto-conical section which interconnects the first cylindrical section of the downstream decompression insert with the second cylindrical section of the downstream decompression insert, a plurality of radial openings are provided only in at least one of a wall of the frusto-conical section of the downstream decompression insert and a wall of the second cylindrical section of the downstream decompression insert.

18. The rotary valve according to claim 17, wherein the upstream decompression insert is arranged in the upstream segment of the body of the rotary valve such that the first cylindrical section of the upstream decompression insert is adjacent the fluid supply section in the pipe and the second cylindrical section of the upstream decompression insert is adjacent the seat of the body, an outer surface of the first cylindrical section of the upstream decompression insert abuts against an interior surface of the upstream segment of the body of the rotary valve, and a diameter of the second cylindrical section of the upstream decompression insert is smaller than a diameter of the first cylindrical section of the upstream decompression insert, and the downstream decompression insert is arranged in the downstream segment of the body of the rotary valve such that the first cylindrical section of the downstream decompression insert is adjacent the fluid exit section in the pipe and the second cylindrical section of the downstream decompression insert is adjacent the seat of the body, an outer surface of the first cylindrical section of the downstream decompression insert abuts against an interior surface of the downstream segment of the body of the rotary valve, and a diameter of the second cylindrical section of the downstream decompression insert is smaller than a diameter of the first cylindrical section of the downstream decompression insert.

* * * * *